Jan. 10, 1967    M. WEINER    3,297,958
SOLAR PUMPED LASER
Filed Jan. 23, 1963
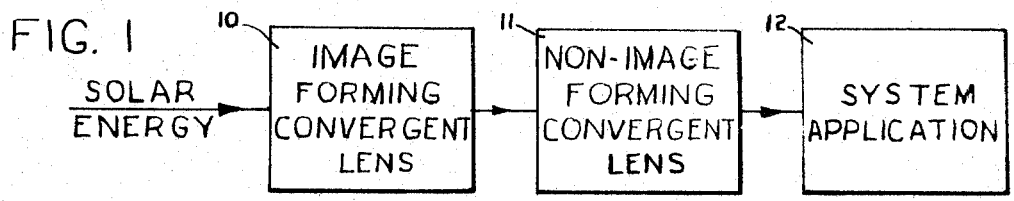
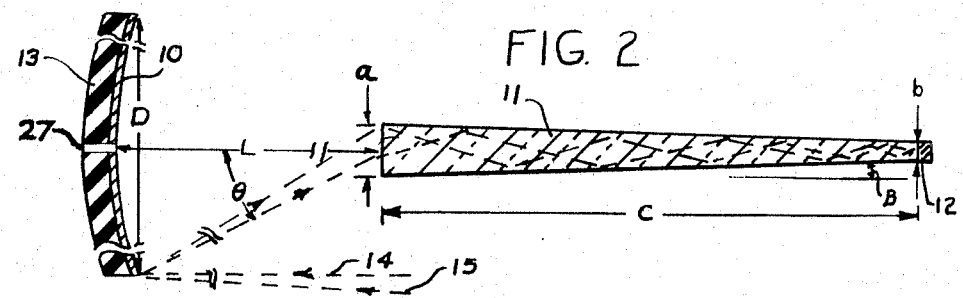
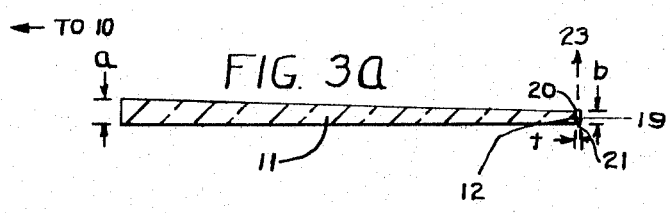 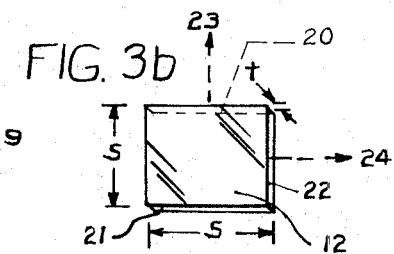
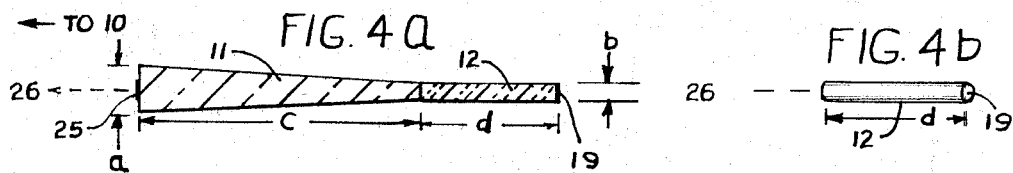 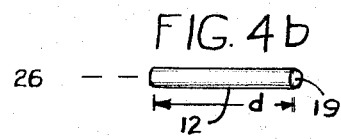
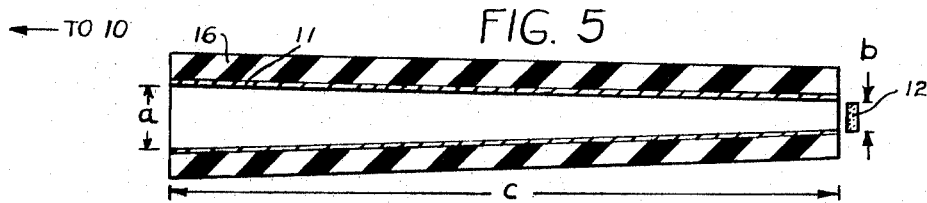
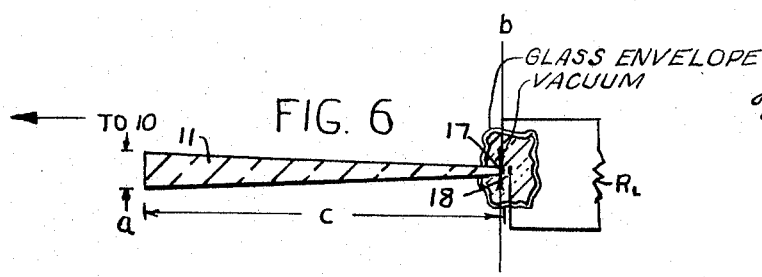
Melvin Weiner
INVENTOR.

# United States Patent Office 3,297,958
Patented Jan. 10, 1967

3,297,958
SOLAR PUMPED LASER
Melvin Weiner, 54 Harvard Ave.,
Brookline, Mass. 02146
Filed Jan. 23, 1963, Ser. No. 253,466
1 Claim. (Cl. 331—94.5)

This invention relates to solar concentrators and to systems which utilize high intensity solar energy. In particular, this invention relates to such solar powered systems as optical masers, high temperature furnaces, and thermionic convertors.

The most common type of solar concentrators for such systems consists of a paraboloidal reflector with the solar energy concentrated at the focal plane of the reflector. Another type of cencentrator often used is a spherical reflector which, although it has less potential concentrating power than a paraboloidal reflector, is advantageous when the axis of the reflector is not always pointed in the direction of the sun. Other types of concentrators may consist of multiple reflectors such as in a Cassegrainian or Newtonian optical system and each reflector may have axial cross-sections which are approximately parabolic, cylindrical, hyperbolic, elliptical or combinations of these shapes.[1] One particularly property shared by these concentrators is that they are all image forming; i.e., except for spherical aberration and coma, there is a one to one correspondence between an object point on the sun's solar disk to an image point at the focal plane of the concentrator. Therefore, the solar energy intensity at the focal plane of these concentrators is not uniform and is usually described as having a "bell-shaped" distribution of energy intensity.

Still other types of solar concentrators are non-image forming and have been reported previously.[2,3] These types of concentrators have consisted of truncated conical reflectors or truncated pyramidal reflectors whose reflecting sides are on the inner surface. After many reflections, the solar energy is concentrated at the smaller base of the truncated reflector and is essentially uniform over its area.

However, a solar concentrator is not only characterized by the distribution of solar energy at its focal plane but also by the magnitude of the solar energy intensity at its focal plane. If $A_p$ is the aperture area of a solar concentrator, $A_t$ is the area of the focal plane in which all the non-absorbed incident energy is concentrated, and T is the fraction of energy not absorbed by losses in the concentrator system, then it can be shown that the concentrating power given by $A_p \cdot T/A_t$ for any concentrator can never be more than $n^2\omega(1-\omega/4\pi)/\Omega$ where $n$ is the index of refraction of the concentrating medium, $\omega$ is the solid angle of solar energy at the focal plane of the concentrator, and $\Omega$ is the solid angle subtended by the sun at the aperture of the concentrator. The solid angle $\Omega$ is approximately $0.68 \times 10^{-4}$ steradians for a concentrator on the earth's surface. The maximum potential concentrating power that can be attained by any solar concentrator on earth is approximately $46,000n^2$ corresponding to a solid angle of energy collection of $\omega = 2\pi$ steradians. Therefore, in addition to the distribution of solar energy at its focal plane, a solar concentrator is also characterized by its concentrating power or its concentrating efficiency given by $(A_p \cdot T/A_t)/46,000n^2$.

Of the image forming types of solar concentrators mentioned above, the paraboloidal reflector is the most commonly used because of its high potential concentrating power. The fraction of energy T transmitted to its focal plane is approximately 0.9 assuming an absorption loss of 0.1 for a single reflection at its reflector surface. For maximum concentrating power, determined by designing the solid angle $\omega$ to be equal to $\pi$ steradians so that spherical aberration and coma are not too excessive, the corresponding cone angle of energy collection at the focal plane is 120 degrees. The concentrating power for such a paraboloid is approximately 17,500 with a corresponding concentrating efficiency of 0.378.

A technique that has been used to increase the concentrating power of image forming types of concentrators has been the use of "immersion optics" in which the target to be illuminated is immersed in an approximately spherical shaped transparent medium of index of refraction $n$ greater than one. Such a technique allows the use of a paraboloid of longer focal length with less spherical aberration and coma without reducing the solid angle of light collection $\omega$. Immersion optics also increase the potential concentrating power by reducing the effective solid angle of solar energy $\Omega$ at the aperture of the concentrator.

In contrast, the non-image forming concentrators reported previously[2,3] have very low concentrating powers because most of the energy is absorbed after several reflections. Even if the power absorbed were negligible, the axial length of the concentrators required for optimum concentrating power is too long for practical construction.

In summary, the prior art of solar concentrators has achieved either high concentrating powers with a non-uniform distribution of solar energy at the focal plane or low concentrating powers with a highly uniform distribution of solar energy at the focal plane.

The chief objects of the invention described herein are
A solar concentrator with substantially greater concentrating power than that obtained by paraboloidal reflectors of the same mechanical tolerances of construction;
A solar concentrator which simultaneously provides a highly uniform distribution of solar energy at the focal plane; and
A solar concentrator system with greater operating efficiency derived from the utilization of higher intensity, more uniformly distributed solar energy with particular application to optical masers, high temperature furnaces, and themionic convertors.

The above objects are realized in an embodiment of the present invention, wherein incident solar energy is concentrated by a compound optical system consisting of an image forming convergent lens of medium $f$/number and a non-image forming convergent lens of low $f$/number. The image forming lens concentrates the solar energy to a small area with little spherical aberration or coma. The non-image forming lens, whose aperture is located at the focal plane of the image forming lens, concentrates the concentrated solar energy to a still smaller arear by a process of multiple reflections with little transmission loss. The resulting solar energy at the focal plane of the non-image forming lens is then utilized for such solar powered applications as optical masers, high temperature furnaces, and themionic converters.

More particularly, one specific embodiment of the present invention consists of a paraboloidal reflector serving as the image forming lens with an approximate $f$/number of $(f/1.0)$, a truncated cone of transparent dielectric material such as sapphire serving as the non-image forming lens with an approximate $f$/number of $(f/0.35)$, and the system utilization of the resulting concentrated solar energy at the smaller end of the truncated cone.

The above specific illustrative embodiment of the present invention is particularly well suited for optical maser (laser) application. For optical maser application, a negative temperature medium in which stimulated emis-

---

[1] W. A. Baum and J. P. Strong, Solar Furnace Support Studies, AFMDC TR 58-7 (also AD 135014), pp. 57–88, 1958.
[2] W. Calver, U.S. Patent 294,117, Feb. 26, 1884.
[3] A. G. Eneas, U.S. Patents 670,916 and 670,917, Mar. 26, 1901.

sion of radiation can occur, such as chromium doped sapphire (ruby), is mated to the smaller end of the truncated cone so that the concentrated solar energy is transmitted to the negative temperature medium. The geometrical configuration of the negative temperature medium, among other possible configurations, can be wafer shaped with flattened pairs of parallel edges so that highly coherent and directional light beams are emitted in a plane perpendicular to the axis of the compound optical system or the medium can be rod shaped so that a highly coherent and directional light beam is emitted along the axis of the compound optical system. The above illustrative embodiment of the present invention achieves an optical pumping power of higher intensity and greater uniformity than previously achieved and allows for efficient continuous wave operation of an optical maser. Optical maser application is particularly well suited to the above embodiment because, in the process of amplification by stimulated emission, very little of the incident solar energy is converted to heat which if excessive could cause deterioration of the mechanical and optical properties of the truncated cone.

Deterioration of the mechanical and optical properties of the truncated cone, caused by excessive heating, is a potentially serious limitation of the above specific embodiment for applications in which high temperatures are generated such as in furnaces and thermionic convertors. Nevertheless, at temperatures below the melting point of the truncated cone, one advantage of the above specific embodiment is that larger mechanical tolerances can be tolerated in the paraboloidal reflector to attain the same temperature as that of a sole paraboloidal reflector of closer mechanical tolerances. A second advantage is the highly uniform distribution of temperature at the heated target. For temperatures to approximately 3500 degrees centigrade, the above specific embodiment can be modified to utilize a truncated conical metallic reflector instead of a truncated dielectric cone so that the heated material need not come in physical contact with the conical reflector. This modified embodiment, despite its greater solid angle of energy collection and less aberration, is limited to attaining the same approximate temperature as that of a sole paraboloidal concentrator because of larger reflection losses. However, unlike the sole paraboloidal concentrator, the modified embodiment of the present invention produces a highly uniform distribution of temperature at the heated target. For temperatures substantially greater than 3500 degrees centigrade, the unmodified specific embodiment of the present invention, can be utilized but with restricted operation. Furnaces and thermionic convertors operating at these high instantaneous temperatures are restricted to operate over short intervals of time so that the average heating does not cause excessive deterioration of the truncated cone.

For some applications such as themoelectric generators, photoelectro-generators, and heat exchangers, the desired concentrating power may be different for each of the two cross-sections. For such applications, the present invention need not have geometric symmetry about its longitudinal axis but may have correspondingly different cross-sections.

Furthermore, the image forming lens of the present invention need not be restricted to a parabolic reflector but may be any image forming convergent lens possessing medium $f$/number with minimal spherical aberration, coma, and transmission loss.

Furthermore, the non-image forming lens of the present invention need not have a truncated conical cross-section but can have any monotonic decreasing cross-section with an axial length at least as long as that of a truncated cone.

The features of the present invention are better understood from the following more detailed discussion taken in conjunction with the accompanying drawing, in which:

FIG. 1 is a block diagram of a solar concentrator system illustratively embodying aspects of the principles of the present invention;

FIG. 2 is an axial cross-section of a solar concentrator system made in accordance with principles of the present invention;

FIG. 3a is an axial cross-section of a solar powered optical maser, utilizing wafer shaped negative temperature material, made in accordance with principles of this invention;

FIG. 3b is a perspective view of the wafer shaped material of FIG. 3a;

FIG. 4a is an axial cross-section of a solar powered optical maser, utilizing a rod shaped negative temperature material, made in accordance with principles of this invention;

FIG. 4b is a perspective view of the rod shaped material of FIG. 4a;

FIG. 5 is an axial cross-section of a modified solar concentrator system made in accordance with principles of this invention; and FIG. 6 is an axial cross-section of a solar thermionic convertor made in accordance with principles of this invention.

Referring now to FIG. 1, a solar concentrator system is shown in which solar energy is incident on the aperture of an image forming convergent lens 10 and is concentrated by said lens to a small area in its focal plane. A non-image forming convergent lens 11, located at the focal plane of lens 10, concentrates the said solar energy by a process of multiple reflections to a still smaller area in its own focal plane. The solar energy, in final concentrated form, is then utilized by the desired system application 12 at the focal plane of lens 11.

An image forming convergent lens, which is consistent with the principles of the present invention, is shown in FIG. 2. The said lens consists of a reflector 10 of parabolic cross-section, aperture diameter D equal to approximately one meter, $f$/number equal to approximately ($f$/1.0), focal length "L" equal to approximately one meter, half-angle $\theta$ of solar energy concentration equal to approximately thirty degrees, image area in its focal plane of diameter $a$ equal to approximately one centimeter, and surface reflectivity R equal to approximately 0.9. The reflecting surface can consist of such materials as silver or aluminum supported by the surface 13 of parabolic cross-section. The surface 13 can be rigid, or it can be elastic, such as mylar, so that it can be inflated for outer space applications. It is understood that cross-sections other than parabolic, such as circular, are applicable as are refractive lenses provided that spherical aberrations and coma do not cause a substantially greater image diameter $a$ for the same $f$/number. It is further understood that the diameter D can be larger or smaller than one meter with corresponding changes in the dimensions L and $a$. An $f$/number equal to approximately ($f$/1.0) is chosen for lens 10 as a compromise between tolerable aberrations from lens 10 and tolerable transmission losses in lens 11. If lens 11 is made of materials with substantially less absorption loss than that of sapphire, the $f$/number of lens 10 can be designed to be larger. For a solar concentrating system of maximum concentrating power, the mechanical tolerances in the cross-sectional shape of lens 10 should be minimized. However, an important advantage of this invention is that it can attain the same concentrating power, utilizing a lens 10 of medium $f$/number and large mechanical tolerances, as that of a solar concentrator consisting of a sole parabolic reflector of lower $f$/number and smaller mechanical tolerances.

A non-image forming convergent lens, which is consistent with the principles of the present invention, is shown in FIG. 2. The said lens consists of a transparent dielectric material 11 of truncated conical cross-section. For a material such as sapphire, the aperture diameter $a$ is equal to approximately one centimeter, the focal plane area of diameter $b$ is equal to approximately 0.4 centimeter, the axial length $c$ is equal to approximately ten centimeters, the cone half-angle $\beta$ is equal to approximately two degrees, the $f$/number is equal to approximately ($f$/0.4), the index of refractor $n$ is equal to approximately 1.75, and the transmissivity is approximately 75%.

The optical properties of lens 11 are illustrated by solar rays 14 and 15. Ray 14 originates from the center of the solar disk and is parallel to the axis of the solar concentrator system. Ray 14 is reflected by lens 10 to the center of the aperture of lens 11. In accordance with Snell's law, the ray is bent toward the aperture normal and travels in a straight line until it reaches the boundary between lens 11 and space. If the angle of incidence with the normal to the tapered surface is greater than a critical angle $\theta_c$ determined by the relation $\theta_c = \arcsin(1/n)$, the ray will be totally reflected at an angle equal to the angle of incidence. After several such reflections, ray 14 will reach the focal plane of diameter $b$ provided the cone half-angle $\beta$ is sufficiently small as determined by well known ray tracing techniques. Otherwise, ray 14 will be reflected back out of the aperture or be refracted out of the tapered surface. It should be noted that ray 14 does not generally end up at the center of the focal plane of lens 11 but at a random point in the focal plane. Ray 15 originates from the edge of the solar disk and makes an angle of 32 minutes with the axis of a solar concentrator system located on the earth's surface. Ray 15 is reflected by lens 10 to the edge of the aperture of lens 11. After a process of refraction and multiple reflections, ray 15 ends up in the focal plane at an arbitrary point relative to that of ray 14.

An advantage of this invention is its capability to effectively scramble incident solar energy to create a uniform distribution in its focal plane. With the above numerical values for the parameters of lens 10 and lens 11, another advantage is the invention's concentrating power of 42,000 as compared with a maximum of 17,500 for a sole paraboloidal reflector. It is also significant that both advantages occur simultaneously rather than one occurring at the expense of the other.

Lens 11, being of relatively small dimensions, can be controlled to have a high degree of optical homogeneity, precision, and transmissivity. It is understood that said lens need not be sapphire but any material of sufficient transparency and index of refraction, such as crown glass, rock salt, sylvite, flourite, or quartz, depending upon the particular system application 12. It is further understood than lens 11 need not have a truncated conical cross-section but can have any monotonic decreasing cross-section provided that end diameters $a$ and $b$ are respectively equal to those of a truncated cone and that the axial length $c$ is no shorter than that of a truncated cone. Lens 11 can conveniently be supported by a tripod attachment to lens 10 or may be supported by the system application 12.

The concentrated solar energy illuminates a material body 12, shown in FIG. 2, located at the focal plane of lens 11 and in close physical contact with lens 11. The nature of the material body 12 depends upon the particular system application. The material body 12 must be in close physical contact with lens 11 so that solar energy will not be internally reflected back out the aperture because of an air or vacuum interface between lens 11 and material 12. Also to prevent internal reflection at the interface, material 12 should preferably have an index of refraction at least as large as that of lens 11 for applications not requiring heating or should have a large emissivity coefficient for applications requiring heating.

For solar furnace application, material 12 should preferably have a large emissivity coefficient or be coated with a material of high emissivity, such as carbon black, to convert the incident electromagnetic energy to heat. One advantage of this invention for solar furnace application is the high uniformity of temperature at the surface of material 12. In addition, the solar concentrator system of FIG. 2, with the above numerical values for the system parameters, can attain instantaneous temperatures in excess of 90% of the sun's nominal surface temperature compared with temperatures of less than 60% for that of a sole paraboloidal reflector. However, at such high temperatures, a shutter must be placed in front of lens 11 for intermittent operation to prevent deterioration of the optical and mechanical properties of lens 11. For continuous operation at temperatures above the melting point of suitable materials for lens 11, FIG. 5 shows an alternate configuration of lens 11. A highly reflecting metal 11, such as silver or aluminum, covers the inside surface of a rigid support 16 in the shape of a truncated cone with a tapering angle $\beta$ a little larger than that of an internally reflecting truncated cone. The material body 12 to be heated is at the smaller end of the truncated cone but not in physical contact with it. The concentration efficiency of this modified configuration is less than that of a dielectric truncated cone because metallic reflection losses are greater than dielectric absorption losses and because the increase in solid angle of light collection does not compensate for the loss of the refractive reduction of the solid angle of incident solar energy.

For thermionic converter application, the material body 12 is of low photoelectric work function and forms the cathode 17 of a vacuum tube as shown in FIG. 6. An anode 18 which is closely spaced to the cathode, a glass envelope which also serves as a seal to the dielectric lens 11, and metallic leads from the cathode and anode complete the other components of the tube. The efficiency of delivering electric power to an external load $R_L$ increases with increasing temperature of the cathode. The present invention is particularly advantageous for outer space applications requiring a thermionic convertor because it allows for an inflatable lens 10 with larger mechanical tolerances than could be allowed in a sole paraboloidal reflector creating the same temperature at the cathode.

For optical maser application, material 12 is a negative temperature medium such as chromium doped sapphire and may have a wafer shaped configuration as shown in FIG. 3a or a rod shaped configuration as shown in FIG. 4a. Material 12 can be cemented to lens 11 by a thermosetting resin or it may be grown as part of the same crystal as lens 11. The wafer shaped configuration is a novel configuration to the optical maser art with particularly unique characteristics and its therefore discussed in some detail. The wafer thickness $t$ is approximately 0.4 millimeter, assuming the above numerical values for the system parameters of FIG. 2, so that optical modes in the plane of the wafer face are reinforced at the expense of modes in the direction of the wafer thickness. The end face of the wafer is coated with a reflecting material 19, such as gold or silver, to double the absorption path of the pumping source. The face of the wafer is in the shape of an even sided polygon with directly opposite edges polished parallel to each other. Each pair of parallel edges, such as 20 and 21, are made at least 97% reflecting but with one edge of each pair, such as 20, made to transmit 1–2% of the incident energy. The edges can be coated with a metal of high reflectivity, such as gold or silver, or with a multilayer dielectric film to achieve the desired reflectivity. The number of sides to the polygon is determined by the number of output beams desired and the beam widths that can be tolerated. As the number of output beams are increased, their corresponding output power levels are reduced to a point where there is zero coherent output power because the number of excited atoms that are stimulated to radiate in a given beam direction are not sufficient to compensate for the losses sustained on each pass between parallel edges. Also, as the number of output beams are increased, the output beam widths are correspondingly reduced. Since the absorption path of the optical pumping power is approximately one hundred times smaller than in the conventional rod shaped configuration, the chromuim doping of the sapphire for the wafer configuration can be one hundred times larger than in the rod shaped configuration. It should be noted, however, that the path length for stimulated radiation is in a different direction to the path length for optical pumping and is only reduced by a factor of approximately ten compared to that of a rod shaped configuration. Since the intensity of solar pump energy, made possible by the present invention, provides more than the minimum pumping power density needed for continuous operation and since the absorption path length of stimulated radiation by excited atoms may be as much as approximately ten times the minimum absorption path length required to sustain amplification, the wafer shaped configuration can support as many as ten continuous wave output beams radiating simultaneously in equally spaced directions encompassing a 360 degree scan. FIG. 3b shows a perspective view of a wafer capable of supporting two output beams 23 and 24. The length of each side $s$ is 0.4 centimeter. The lens 11 in FIG. 3a is a prismoid with a cross-section corresponding to that of wafer 12 so that wafer 12 is illuminated uniformly. Referring now to the rod shaped configuration of FIGS. 4a, 4b, the rod has a length $d$ equal to approximately four centimeters and has a diameter $b$ equal to 0.4 centimeter corresponding to the above numerical values of the system parameters of FIG. 2. The rod's end face 19 is treated to be highly reflecting in a manner similar to that of the wafer end face 19. A reflecting surface 25 of diameter $b$ is located on the aperture of the truncated cone 11 and is parallel to face 19. Face 25 is highly reflecting but transmits 1–2% of the stimulated radiation. The output beam 26 is parallel to the axis of the solar concentrator system and passes through a small hole in lens 10. If rod 12 is a material such as ruby with an approximate doping of $10^{18}$ chromium atoms per cubic centimeter, the present invention provides an optical pumping power, within the absorption band of ruby, which is substantially in excess of the threshold pumping power density needed for continuous wave operation.

What is claimed is:

A solar powered optical maser consisting of
a paraboloidal reflector which collects and concentrates solar energy to within a linear half angle of approximately 30 degrees at its focal plane,
a prismoid of transparent dielectric material, with a tapering angle of approximately two degrees, whose larger base is at the focal plane of the paraboloidal reflector, and
a wafer, of negative temperature material, with one face attached to the smaller base of the prismoid and the other face made to be reflecting, whose cross-section is an even sided polygon, whose pairs of directly opposite edges are parallel and reflecting with one edge of each pair transmitting a small percentage of the stimulated radiation, whose thickness is substantially less than the distance between parallel edges, and whose number of parallel edges determine the number of output beams and their beam widths.

References Cited by the Examiner

UNITED STATES PATENTS

| 294,117 | 2/1884 | Calver | 126—271 |
| 2,945,958 | 7/1960 | Morris | 88—1 X |
| 2,981,826 | 4/1961 | Mattern | 88—1 |
| 3,051,038 | 8/1962 | Duke | 88—1 |

OTHER REFERENCES

Boyle et al.: "A Continuously Operating Ruby Optical Maser," Applied Optics, vol. 1, No. 2, March 1962, pp. 181–183.

Bushor: "Sun and Exploding Wires Pump Lasers," Electronics, vol. 35, No. 13, March 30, 1962, pp. 24 and 25.

Cook: "Output Power and Possible Continuous Operation of Ruby Lasers," Proceedings of the IRE, vol. 50, No. 3, March 1962, pp. 330 and 331.

Schmeck: "Gain Is Reported in Optical Maser," New York Times, Jan. 25, 1962, vol. CXI, No. 37987, page 26.

Stitch: "Power Output Characteristics of a Ruby Laser," Journal of Applied Physics, vol. 32, No. 10, October 1961, pp. 1994 to 1999.

Williamson: "Cone Channel Condenser Optics," Journal of the Optical Society of America, vol. 42, No. 10, October 1952, pp. 712–715.

References Cited by the Applicant

UNITED STATES PATENTS

| 670,916 | 3/1901 | Eneas. |
| 670,917 | 3/1901 | Eneas. |

OTHER REFERENCES

Glaser et al.: "The Flux Redistributor," Solar Energy VII, No. 1, January–March 1963, pp. 12–17.

W. A. Baum and J. P. Strong: Solar Furnace Support Studies, pp. 57–88, 1958.

Weiner: "Light Gathering Properties of Optical Systems With Extended Sources," Journal of the Optical Society of America, vol. 54, No. 9, September 1964, pp. 1109–1110.

JEWELL H. PEDERSEN, *Primary Examiner.*

JAMES W. WESTHAVER, *Examiner.*

C. J. MYHRE, J. L. CHASKIN, R. L. WIBERT,
*Assistant Examiners.*